US012609592B2

(12) United States Patent　　　　　(10) Patent No.:　US 12,609,592 B2
Naik et al.　　　　　　　　　　　　　(45) Date of Patent:　Apr. 21, 2026

(54) SYSTEMS AND METHODS FOR CONTROL OF A PUMP MOTOR

(71) Applicant: Regal Beloit America, Inc., Beloit, WI (US)

(72) Inventors: Neelam Naik, Thane (IN); Sagar Yennam, Bhiwandi (IN); Rushikesh Bhosale, Satara (IN)

(73) Assignee: Regal Beloit America, Inc., Milwaukee, WI (US)

( * ) Notice: Subject to any disclaimer, the term of this patent is extended or adjusted under 35 U.S.C. 154(b) by 250 days.

(21) Appl. No.: 18/484,543

(22) Filed: Oct. 11, 2023

(65) Prior Publication Data

US 2024/0128838 A1　　Apr. 18, 2024

(30) Foreign Application Priority Data

Oct. 12, 2022　(IN) .............................. 202211058284

(51) Int. Cl.
G05D 1/02　　　　(2020.01)
H02K 11/35　　　(2016.01)
F04D 13/06　　　(2006.01)

(52) U.S. Cl.
CPC .............. H02K 11/35 (2016.01); F04D 13/06 (2013.01)

(58) Field of Classification Search
CPC .... G05B 15/02; G05B 15/00; G05B 2219/00; G05B 11/00; H02K 11/35
See application file for complete search history.

(56) References Cited

U.S. PATENT DOCUMENTS

| | | |
|---|---|---|
| 5,667,362 A | 9/1997 | Murai et al. |
| 10,644,627 B2 | 5/2020 | Iwaji et al. |
| 11,118,610 B2 | 9/2021 | Blanding et al. |
| 11,920,536 B1 | 3/2024 | Schultz et al. |
| 2023/0243357 A1 | 8/2023 | Bovill et al. |

FOREIGN PATENT DOCUMENTS

| | | | | |
|---|---|---|---|---|
| CN | 101615872 A | * | 12/2009 | |
| CN | 108854474 A | * | 11/2018 | ........... B01D 53/261 |
| KR | 20210109992 A | * | 9/2021 | ............. D06F 33/30 |

* cited by examiner

*Primary Examiner* — Karen Masih
(74) *Attorney, Agent, or Firm* — Armstrong Teasdale LLP

(57) ABSTRACT

A control system for controlling an electric motor in a pump system. The control system includes a communications interface configured to be electrically coupled with a remote control system and receive a command therefrom. The control system further includes a processing unit coupled to the communication interface and configured to receive the command from the communications interface, process the command to determine which communication protocol among a plurality of communication protocols to employ, and control the communications interface to transmit a response to the command using at least a portion of the communication protocol.

20 Claims, 6 Drawing Sheets

500

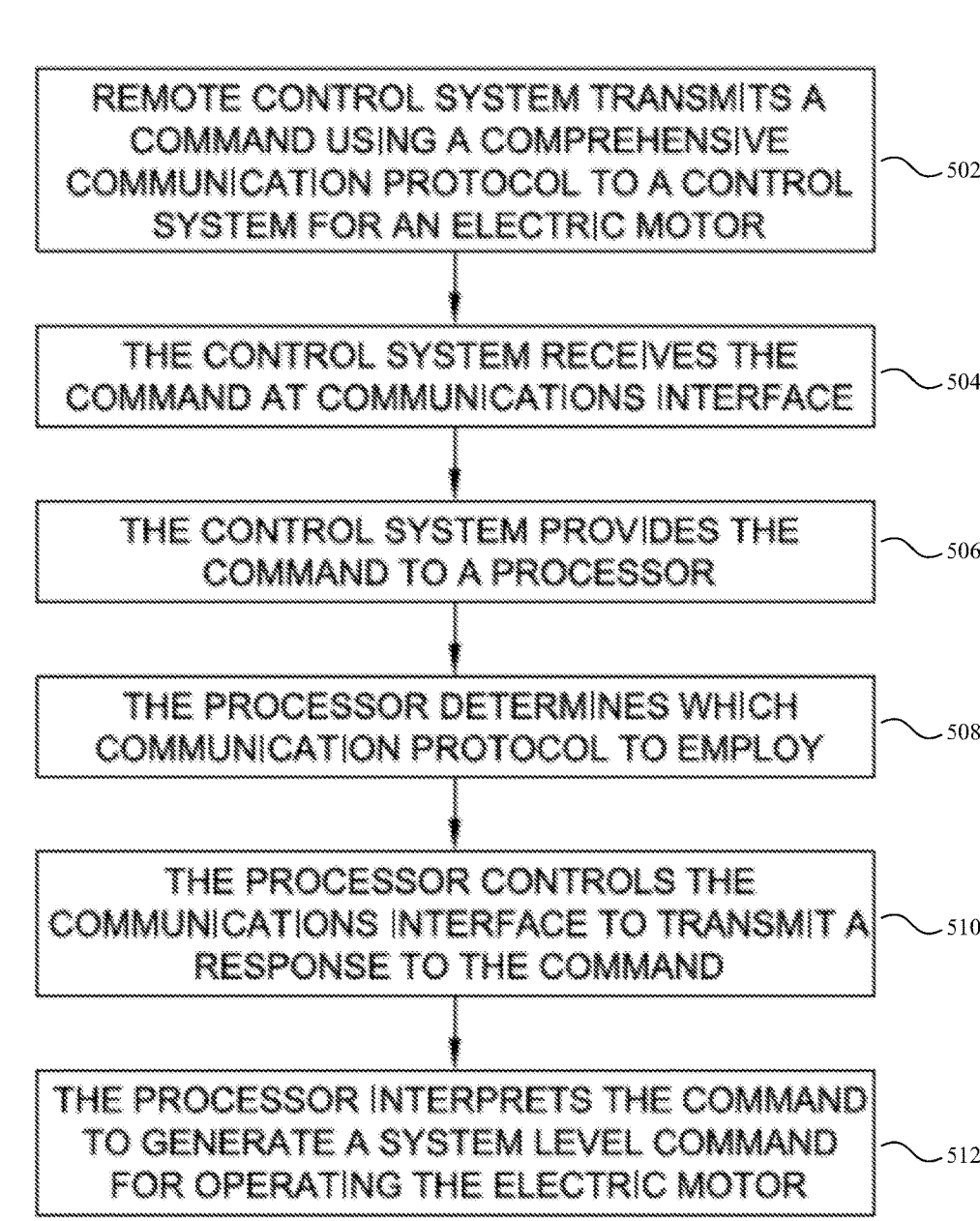

REMOTE CONTROL SYSTEM TRANSMITS A COMMAND USING A COMPREHENSIVE COMMUNICATION PROTOCOL TO A CONTROL SYSTEM FOR AN ELECTRIC MOTOR ~502

THE CONTROL SYSTEM RECEIVES THE COMMAND AT COMMUNICATIONS INTERFACE ~504

THE CONTROL SYSTEM PROVIDES THE COMMAND TO A PROCESSOR ~506

THE PROCESSOR DETERMINES WHICH COMMUNICATION PROTOCOL TO EMPLOY ~508

THE PROCESSOR CONTROLS THE COMMUNICATIONS INTERFACE TO TRANSMIT A RESPONSE TO THE COMMAND ~510

THE PROCESSOR INTERPRETS THE COMMAND TO GENERATE A SYSTEM LEVEL COMMAND FOR OPERATING THE ELECTRIC MOTOR ~512

FIG. 5

SYSTEMS AND METHODS FOR CONTROL OF A PUMP MOTOR

CROSS-REFERENCE TO RELATED APPLICATIONS

This application claims priority to Indian Provisional Patent Application Serial No. 202211058284, filed Oct. 12, 2022, the entire contents and disclosure of which are hereby incorporated herein by reference in its entirety.

TECHNICAL FIELD

The field of the disclosure relates generally to a fluid moving system and, more specifically, a pool or spa pump motor configured for communication with a remote control system.

BACKGROUND OF THE INVENTION

Pool and spa pumps are used to circulate water within a variety of pool types, such as swimming pools, spas, hot tubs, fountains, and the like. The circulation of the water disperses chemicals added to the water to provide for acceptable water conditions. The circulation also permits the passage of water through a filter to remove impurities from the water. Typically, these pumps may operate for a portion of the week, such as on a preselected schedule, or as a single speed motor.

Some pump systems have electronic controllers located adjacent the electric motors, i.e., remote from the electric motor, such as mounted within a wall box or other electronics enclosure. These remote controllers, sometimes referred to as automation systems, regulate the operation of the pump motor and may be programmed to control the on and off times of the electric motor, along with other equipment. They may also control the speed of the pump if the electric motor has more than one possible speed, and query for status, faults, errors, environmental conditions, or operating conditions, etc.

SUMMARY OF THE INVENTION

In one aspect, a control system is provided for controlling an electric motor in a pump system. The control system includes a communications interface configured to be electrically coupled with a remote control system and receive a command therefrom. The control system further includes a processing unit coupled to the communication interface and configured to receive the command from the communications interface, process the command to determine which communication protocol among a plurality of communication protocols to employ, and control the communications interface to transmit a response to the command using at least a portion of the communication protocol.

BRIEF DESCRIPTION OF THE DRAWINGS

FIG. 5 is a flow diagram for a method of controlling an electric motor; and

DETAILED DESCRIPTION

Figure 1:
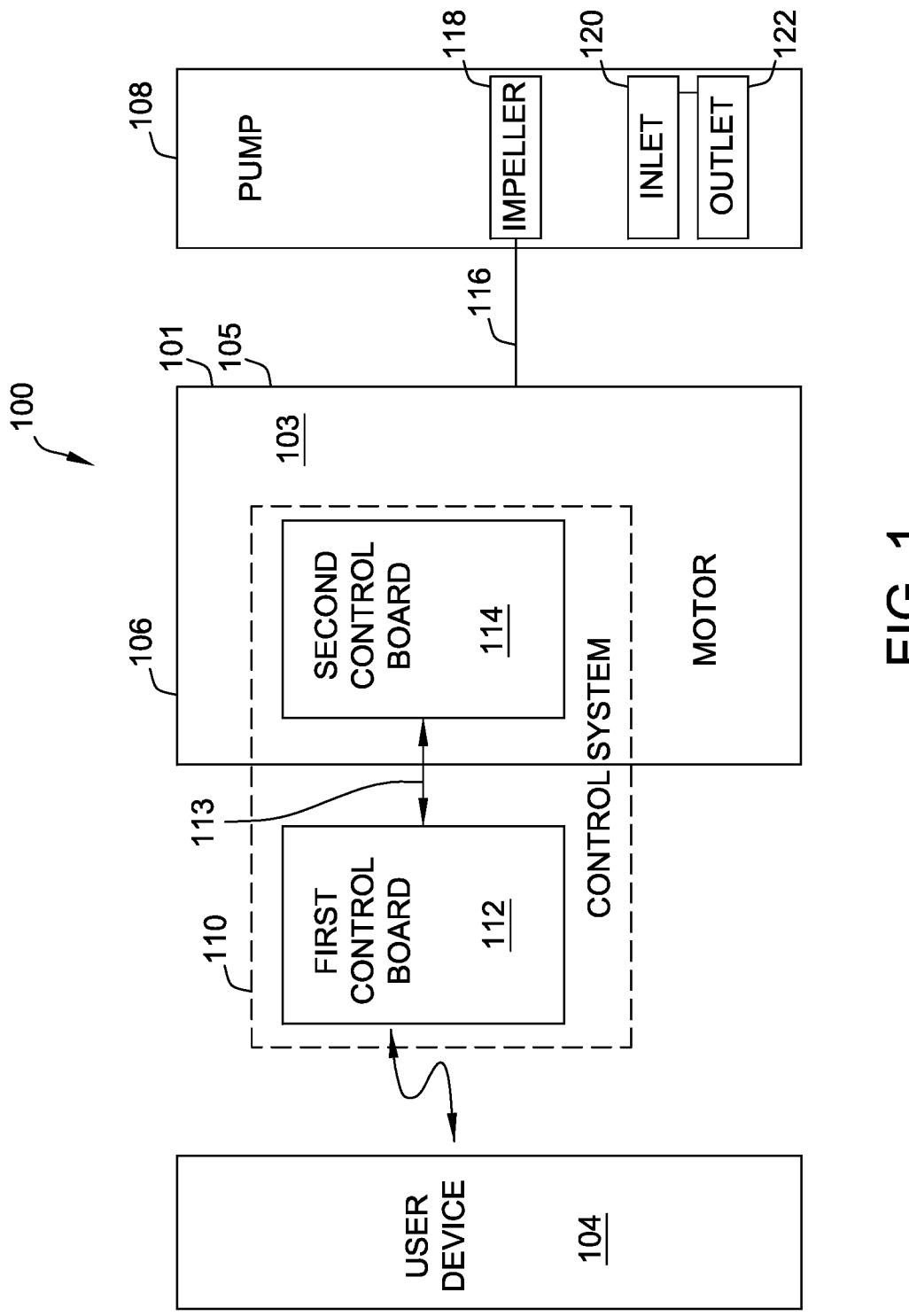
FIG. 1 is a block diagram illustrating an example embodiment of a pump system having a control system including a first control board and a second control board.

Embodiments of the disclosed pump system include an electric motor and a control system. The control system may be embodied on a single control board or separated into a first control board (e.g., an "application board") and a second control board (e.g., a "drive board). In an example embodiment, the first control board is enclosed in a top box that may be coupled to an exterior portion of the pump system, such as an exterior of a pump motor. The second control board may be contained within a motor housing and communicatively coupled via a wired and/or wireless connection to the first control board. In operation, the first control board can communicate with a remote control system, such as an automation system that a user may interface with directly or indirectly to provide input. In an example embodiment, the first control board processes input to generate one or more system-level commands for controlling operation of the motor, such as "stop," "go," and/or "status" commands.

Common automation systems, i.e., remote control systems, in fluid moving systems, e.g., pool and spa applications, communicate with various equipment over wired interfaces using an array of analog or digital inputs and outputs or relay control. Notably, such remote control systems commonly control electric motors for pump systems using a wired serial channel such as RS485. Alternatively, remote control systems may utilize any other suitable wired interface or wireless, i.e., the physical layer. Remote control systems conventionally operate on a master-slave basis where the remote control system transmits commands and listens for a response. The receiving equipment, e.g., an electric motor for a pump system, receives the transmitted command and processes it to determine (a) an appropriate response and (b) an appropriate operation, i.e., the software layer. Remote control systems vary by manufacturer and potentially even by model for a given manufacturer, however; and with that variation often follows variability in the format, data rate, content, and other parameters of the communication between, for example, the automation system and the pump system. Such variation is embodied collectively in a communication protocol implemented between the remote control system and, for example, the software layer for an electric motor. In practice, and where conventional pump systems exhibit limitations, each unique remote control system employs a unique communication protocol, and conventional pump systems employ a control system and, more specifically, a software layer configured for a given single communication protocol.

Embodiments of the disclosed pump system include an electric motor and a control system. The control system includes a physical layer configured, for example, for RS485 communication, and a software layer universally compatible with at least a portion of numerous communication protocols, each otherwise individually unique to a given remote control system. Once connected at the physical layer, e.g., on the RS485 channel, a remote control system transmits a command to the pump system and, more specifically, the control system for the electric motor. The disclosed control system receives the transmitted command and evaluates, in the software layer, various parameters of the communication, including the frame format, frame content, and data rates to determine which communication protocol, or portion thereof, to employ in communicating with the remote control system and in operating the electric motor. The control system, namely a processing unit, is configured to employ certain aspects of the communication protocol to transmit an appropriate response to the command from the remote control system. The processing unit is further configured, for certain commands, to employ certain aspects of the communication protocol to interpret the command in input-level processing to generate system-level commands for driving the electric motor. The processing unit of the control system, i.e., the software application executed thereon, in at least some embodiments, does not implement each unique communication protocol comprehensively. Instead, the software application implements fundamental commands and functionality for operating the pump system; but may exclude various aspects of the comprehensive communication protocol employed by a given remote control system, e.g., a given automation system.

FIG. 1 is a block diagram illustrating an example embodiment of a pump system 100. In the example embodiment, pump system 100 includes a remote control system 104, a motor 106, and a pump 108, sometimes referred to as the "wet end."

Motor 106 is any of a variety of suitable electric motors, such as an electric variable speed motor. In the example embodiment, motor 106 includes a control system 110 for controlling the operation of motor 106, such as a speed of motor 106, on and/or off times of motor 106, and the like. In addition, motor 106 includes a housing 101 defining an interior region 103 and having an exterior surface 105. Other components, such as a rotor, a stator, a commutator, and the like may be included, but are not central to an understanding of the present disclosure and are not therefore described in additional detail.

Control system 110 may include a first control board 112 ("first control portion" or "application board"), and a second control board 114 ("second control portion" or "drive board"), each of which are shown and described in additional detail with reference to FIG. 2 below. Alternatively, control system 110 may be embodied in a single control board. Referring again to the embodiment shown in FIGS. 1 and 2, generally, first control board 112 and second control board 114 may include any suitable printed circuit board (PCB) or printed circuit board assembly (PCBA), such as any PCB mounted with various hardware components, including, for example, processors, integrated circuits, memory devices, resistors, capacitors, inductors, transformers, and/or any other such hardware.

In some embodiments, first control board 112 and second control board 114 include a combination of hardware and/or software, the latter of which may be stored as computer-executable instructions within one or more memory devices of control boards 110 and/or 112. Moreover, in some implementations, first control board 112 may be configured to perform a variety of input-level processing, such as providing a graphical user interface, receiving input from remote control system 104, translating input into system-level commands, such as "go" or activation commands, "stop" or deactivation commands, speed commands, and status commands. First control board 112 may be referred to as an "application board." Similarly, second control board 114 may be configured to perform a variety of system-level processing, such as receiving system level commands from first control board 112, providing control signals to pump 108 in response to receiving commands from first control board 112 and/or driving pump 108, performing safety and status checks, and the like. Second control board 112 may be referred to as a "drive board." As described herein, first control board 112 may be communicatively coupled to second control board 114 by a system or control bus 113, and/or any other suitable wired and/or wireless communications channel.

In the example embodiment, remote control system 104 may include any suitable computing device capable of providing control instructions, such as commands over a wired serial channel, to control system 110. For instance, in at least some implementations, remote control system 104 includes an automation system having one or more processing units and one or more modules for analog or digital input and output. Remote control system 104 includes an interface for a wired serial channel, such as RS485, RS232, or CAN for communicating with control system 110. Similarly, control system 110 includes an interface for a wired serial channel, such as RS485, RS232, CAN or other suitable channel, and may further be capable of any of a variety of wireless communications protocols such as BLUETOOTH communications, WiFi communications, near field communications (NFC), radio frequency (RF) communications, narrow band internet of things (IOT), such as a wireless 5G signal (e.g., in range of approximately 30 GHz to 100 GHz), and/or any other suitable communications protocol.

Pump 108 is mechanically coupled to motor 106 by a drive shaft 116 that rotates an impeller 118 of pump 108 to draw fluid (e.g., water) in through a fluid inlet 120. Within pump 108, a variety of filtration and chemical treatment processes may be performed. For example, water drawn in through inlet 120 may be passed through a filter and/or exposed to one or more chemical compounds (e.g., Chlorine). Following filtration and treatment, the fluid is expelled from pump 108 by way of an outlet 122 for recirculation in the original fluid body (e.g., the swimming pool or spa).

Figure 2:
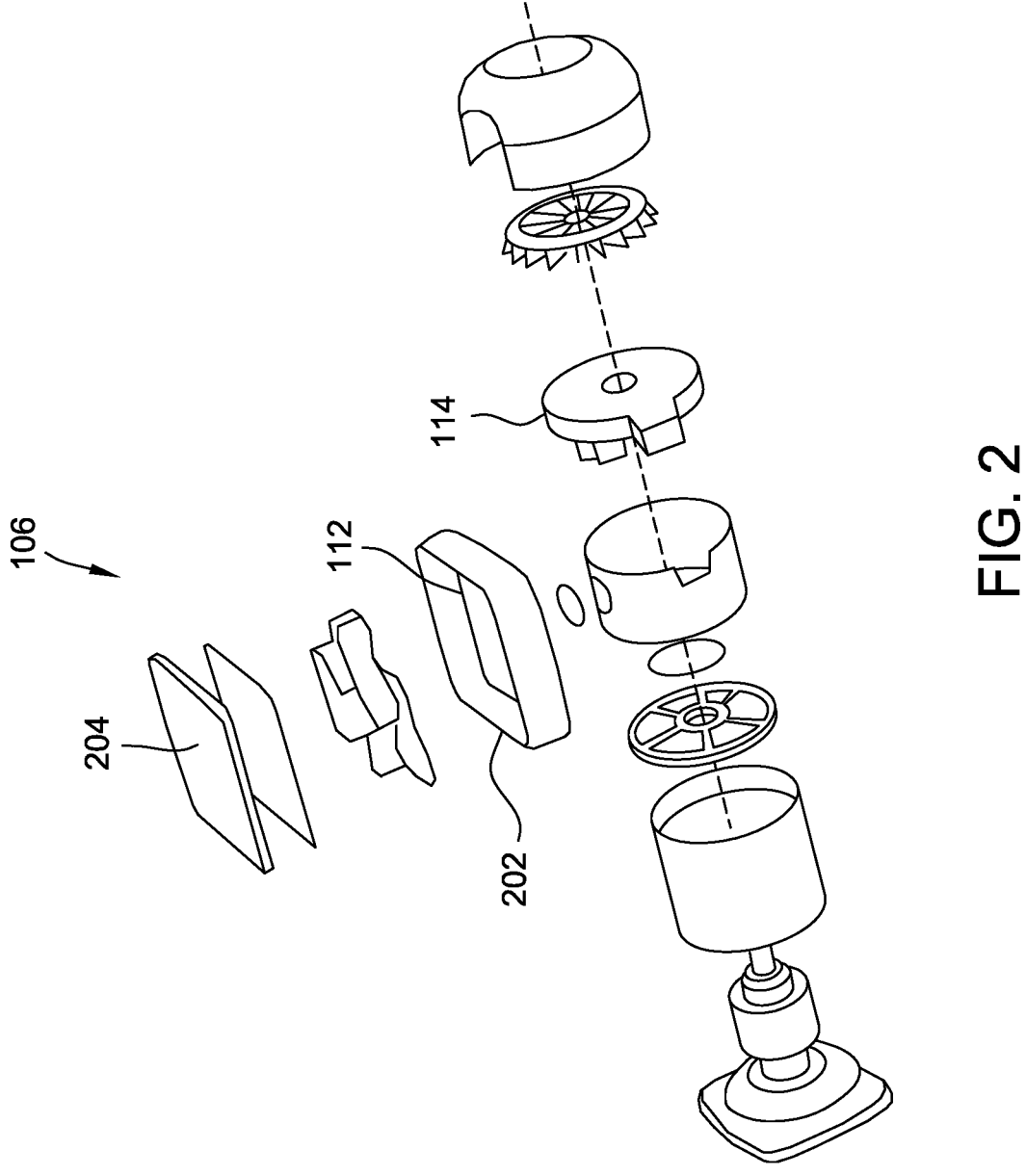
FIG. 2 is an exploded view of an example embodiment of the motor of the pump system shown in FIG. 1.
Figure 3:
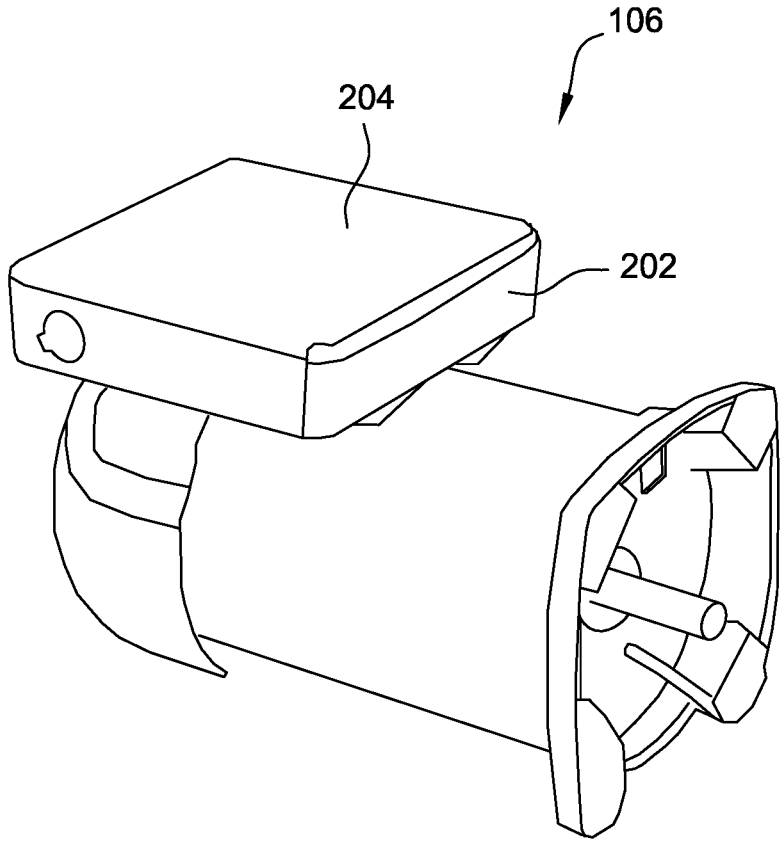
FIG. 3 is a perspective view of an example embodiment of the motor shown in FIGS. 1-2.

FIG. 2 is an exploded view of an example embodiment of motor 106 (as shown in FIG. 1). FIG. 3 is a perspective view of the example embodiment of motor 106 (shown in FIGS. 1 and 2).

Accordingly, referring to FIG. 2 and FIG. 3, motor 106 includes first control board 112 and second control board 114, as described herein. In the example embodiment, first control board 112 may be enclosed or contained within a top box 202, which may reside outside motor housing 101, and which may mechanically couple to exterior surface 105 of housing 101 to form a portion of motor 106 assembly. Top box 202 may be sealed, such as by gaskets, fasteners, and the like, to form a liquid tight seal around first control board 112. In addition, in at least some embodiments, top box 202 may include a window 204 that is permeable or semi-permeable to electromagnetic radiation. Specifically, window 204 may allow a suitable wireless signal to enter within top box 202 for reception by first control board 112, as described herein. As such, window 204 may be permeable or semi-permeable to any BLUETOOTH, WiFi, NFC, RF, and/or any narrow band IOT signal, such as any wireless 5G signal, as well as any 3G and/or 4G signal. Top box 202 may further include a connector, port, or other wire egress to enable routing of a wired communication channel from first control board 112.

Figure 4:
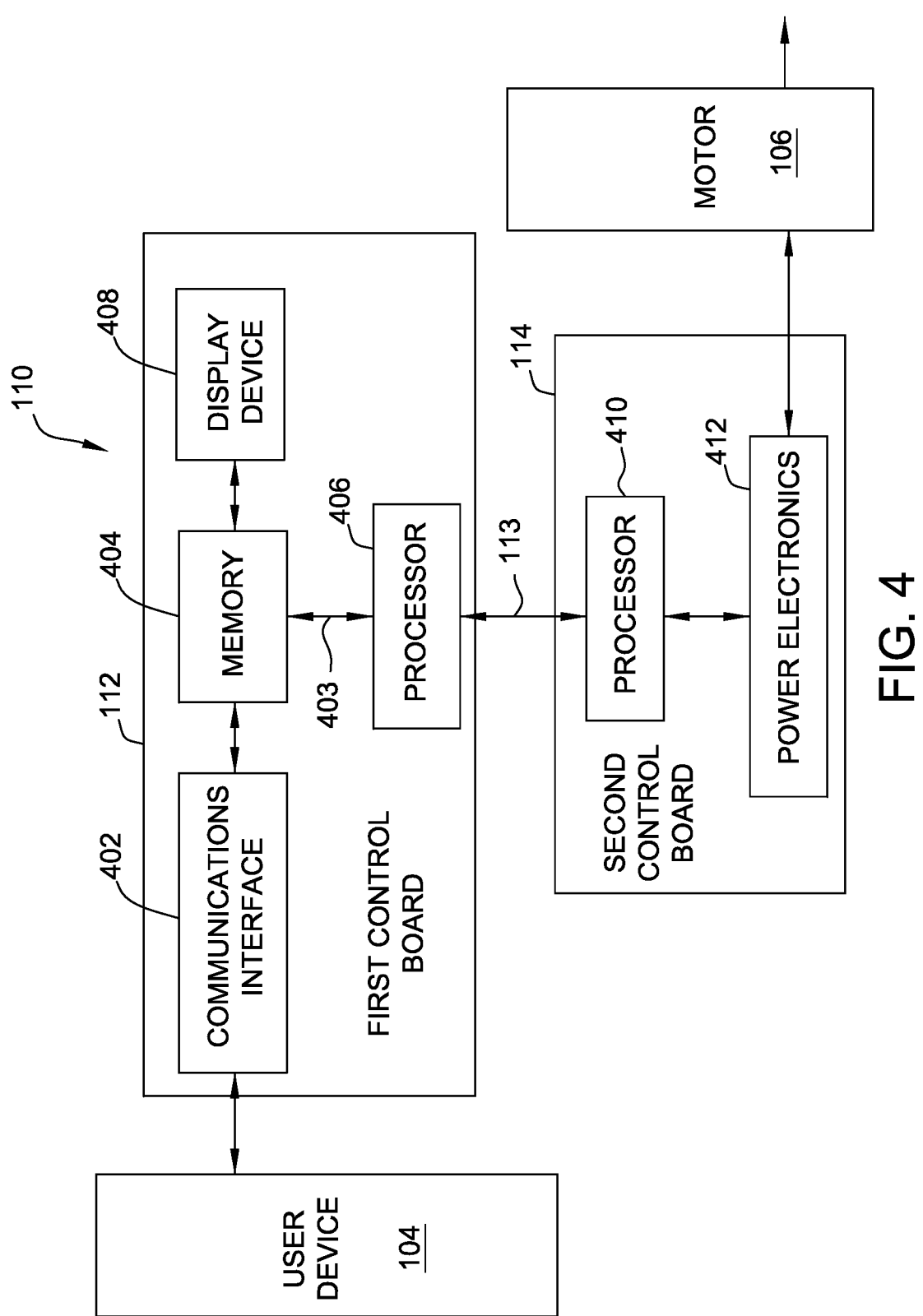
FIG. 4 is a block diagram illustrating an example embodiment of the first control board and the second control board shown in FIGS. 1-3.

FIG. 4 is a block diagram illustrating an example embodiment of first control board 112 and second control board 114 (shown in FIG. 1). As shown, first control board 112 may include a communication interface 402, a memory device 404, a controller or processor 406, and, in certain embodiments, a display device 408, each of which may be communicatively coupled or interconnected, as desired, by a system bus 403. In various embodiments, communication interface 402, a physical layer, may include any suitable wired communication interface, such as a serial interface for RS485, RS232, CAN, etc. In certain embodiments, communication interface 402 also includes one or more transceivers configured for BLUETOOTH, WiFi, NFC, and/or RF communications. Display device 408 may be embodied in any of a variety of suitable implementations, such as, but not limited to, as a liquid crystal display device (LCD), a membrane display device, any touchscreen display device, such as a capacitive touchscreen display device, and/or any other suitable display device. In some embodiments, display device 408 includes or displays touchscreen options (e.g., touchscreen "buttons") for controlling motor 106 and/or pump 108.

Second control board 114 includes a processor 410 and a power electronics module 412, which may be electrically and/or communicatively coupled, as desired. In the example implementation, power electronics module 412 includes an AC-DC converter (e.g., a forward converter, or rectifier), a DC-AC converter (e.g., a power inverter), and the like. In addition, although not shown, second control board 114 may include a communication interface that communicates directly (or via a wireless network) with remote control system 104. Specifically, although in the example implementation, first control board 112 handles communication with remote control system 104, in at least one embodiment, second control board 114 may alternatively or additionally communicate with remote control system 104.

Control system 110 may, as described herein, be disposed, at least partially within housing 101 of motor 106. For example, second control board 114 may be disposed within interior region 103 of housing 101. Stated another way, in at least some embodiments, second control board 114 may be sealed within housing 101 to prevent, or reduce, contact between a liquid (e.g., water) outside motor 106 and second control board 114. As a result, second control board 114, which may perform certain system-level commands as well as control pump 108, may be contained within housing 101 to protect second control board 114, which may, in turn, result in a more damage-resistant, robust construction of motor 106.

In the example embodiment, at least a portion of first control board 112 may be disposed within top box 202, as described above, and/or coupled on external surface 105 of housing 101, such that top box 202 is accessible from outside housing 101. In addition, in at least some embodiments, display device 408 of first control board 112 (if it is included) may be disposed and/or accessible from external surface 105 of housing 101 to enable user interaction with display device 408. More particularly, display device 408 may be accessible by a user outside housing 101 to facilitate receiving user input commands, displaying status and other media output to the user, and the like. However, in at least some embodiments, first control board 112 excludes display device 408.

Accordingly, it can be seen that first control board 112 and second control board 114 may, in at least some embodiments, be physically distinct components and/or physically partitioned, such that at least a portion of first control board 112 may reside outside housing 101 for accessibility by a user. Although control boards 112 and 114 may be physically separated, as described herein, in the example embodiment, first control board 112 is electrically and/or communicatively coupled to second control board 114, such as by way of a system or control bus 113. Likewise, in at least one embodiment, first control board 112 may wirelessly communicate with second control board 114, such as using any suitable wireless communication protocol (e.g., NFC, BLUETOOTH, WiFi, and others, as described herein).

In addition to these features, and as a result of separating first control board 112 from second control board 114, in some embodiments, first control board 112 can be replaced, or swapped (e.g., if first control board 112 is damaged or an upgrade or retrofit is desired), with a replacement control board without removal of second control board 114. Specifically, in at least some embodiments, second control board 114 may be arranged for "plug and play" or similar functionality with first control board 112, whereby removal of first control board 112 is accomplished simply by disconnecting first control board 112 from second control board and reconnecting a replacement control board to second control board 114.

Moreover, in at least some embodiments, second control board 114 may also store instructions for safety and/or control of motor 106. For example, in addition to instructions for performing system-level commands described above, safety and control instructions may be included in firmware stored on second control board 114. As a result, in at least some embodiments, at least some of the instructions stored on second control board 114 may be subject to regulation and/or certification requirements. Accordingly, as described elsewhere herein, at least one advantage of physically separating first control board 112 from second control board 114 is that replacement of first control board 112 may not require recertification of second control board 114 and/or motor 106 as a whole. Rather, first control board 112 may be swapped or replaced, as described, without any recertification or re-inspection requirement. In addition, because second control board 114 may, in the example embodiment, store all safety instructions in firmware, malfunctioning, damage, or loss of first control board 112 may not impact safe operation of motor 106.

In operation, a user may interact with a graphical user interface provided directly on remote control system 104, or indirectly via a remotely accessible user interface (UI), to control operation of motor 106 and/or pump 108. For example, the user may specify a motor speed, on and off times, and the like, via remote control system 104. Similarly, remote control system 104 may display any suitable operating information related to motor 106 and/or pump 108, such as pump speed, on and off times, filter life, chemical analysis, motor temperature, and the like.

In response to receiving user input, remote control system 104 may transmit input to control system 110 of motor 106 over one or more wired channels, such as, for example, a serial channel, via communications interface 402. One example serial channel commonly implemented among pump systems and remote control systems is RS485. Other potentially suitable wired communication channels include RS232 and CAN bus. More particularly, a processing unit of remote control system 104 transmits commands over a wired channel to communication interface 402 of first control board 112 to provide the input to first control board 112. Each command transmitted over the channel contains a sequence of frames, each containing bits of data such as, for example, a start byte, an end byte, a length of the transmission, the actual command, a CRC or checksum or other element to ensure data integrity, or other data. Different remote control systems 104 may arrange commands in a variety of orders, content, and number of frames, i.e., different frame formats. Several example frame formats are shown below (each frame shown within the symbols < . . . >):

```
< start byte > < command > < CRC > < end byte >
< start byte > < length > < command > < data > < CRC >
< start byte > < length > < command > < data > < CRC > < end byte >
```

Control board 112 and, more specifically, processor 406, processes the input, such as by executing instructions on processor 406 stored in memory 404, to provide one or more control instructions to second control board 114 for controlling operation of motor 106 (e.g., adjusting motor speed, on and off times, etc.) Instructions, or an executable software program, stored either in RAM for processor 406 or in memory 404 includes at least a portion of a comprehensive communication protocol employed by the remote control system 104 to transmit commands. The instructions further include a software application, i.e., a software layer, universally compatible with the comprehensive communication protocol employed by remote control system 104 as well as numerous other communication protocols, each otherwise individually unique to a given remote control system.

Additionally, communications interface 402 may, in some embodiments, include wireless communication interfaces, such as BLUETOOTH, WiFi, NFC, RF, or other wireless protocol (e.g., narrow band IOT, 5G, etc.). More particularly, a transceiver of remote control system 104 may wirelessly communicate with communication interface 402 of first control board 112 to provide input to first control board 112. Control board 112 may process the input, such as by executing instructions on processor 206 stored in memory 204, to provide one or more control instructions to second control board 114 for controlling operation of motor 106 (e.g., adjusting motor speed, on and off times, etc.)

For example, as described above, processor 406 may convert or translate input from remote control system 104 into system-level commands for execution by second control board 114, such as "go" or activation commands, "stop" or deactivation commands, status commands, and the like. Likewise, processor 410 of second control board 114 may perform and/or facilitate system-level processing, such as receiving commands from first control board 112, providing control signals to pump 108 in response to receiving commands from first control board 112, performing safety and status checks, and the like. Similarly, first control board 112 may control display device 408 to display adjusted settings, various media output, and the like.

Accordingly, motor 106 and pump 108 can, in the example embodiment, be controlled by remote control system 104 without interaction by the user with display device 408 on motor 106 itself. Similarly, in at least some embodiments, no display device 408 is included, such that remote control system 104 is substituted for any display device physically integrated with or coupled to motor 106.

FIG. 5 is a flow diagram 500 for a method of controlling a pump motor, for example, by a remote control system such as remote control system 104 shown in FIGS. 1 and 4. The pump motor may be, for example, an electric motor such as electric motor 106 shown in FIGS. 1-4. Remote control system 104 and electric motor 106 are electrically coupled over a wired serial channel such as, for example, an RS485 channel. Remote control system 104 transmits 502 a command according to a comprehensive communication protocol, and control system 110 of electric motor 106 receives 504 the command at communications interface 402, representing the physical layer. Communications interface 402 provides 506 the command to processor 406 directly via bus 403 or indirectly via memory 404.

Processor 406 is configured, by the execution of a software application, to implement at least a portion of the comprehensive communication protocol employed by remote control system 104, as well as at least portions of communication protocols for one or more other unique remote control systems. The software application configures processor 406 to evaluate various parameters, such as data rate, frame format, and frame content of the command to determine 508 which communication protocol, or portion thereof, to employ in communicating with remote control system 104 and in operating electric motor 106.

Processor 406, in certain embodiments, is configured to monitor communications interface 402 at various data rates, or baud rates, to identify the frames within a given command transmission from remote control system 104. Generally, monitoring the channel at different baud rates results in receipt of different frames and a different number of bytes. Processor 406 evaluates whether received frames for a given baud rate correspond to a given communication protocol and, if not, processor 406 reconfigures communications interface 402 to monitor the channel at a different data rate, e.g., 1200, 4800, 9600 baud, etc. For example, processor 406, for frames received at a given data rate, determines whether the received frames include recognized start bytes, end bytes, or checksums. If not, the data rate is changed. If processor 406 determines received frames include, for example, a recognized start byte, end byte, and checksum, then the data rate and corresponding frame format are "locked in," which is to say the communication protocol is identified. Further operations by processor 406 are then performed according to at least a portion of the communication protocol.

Figure 6:
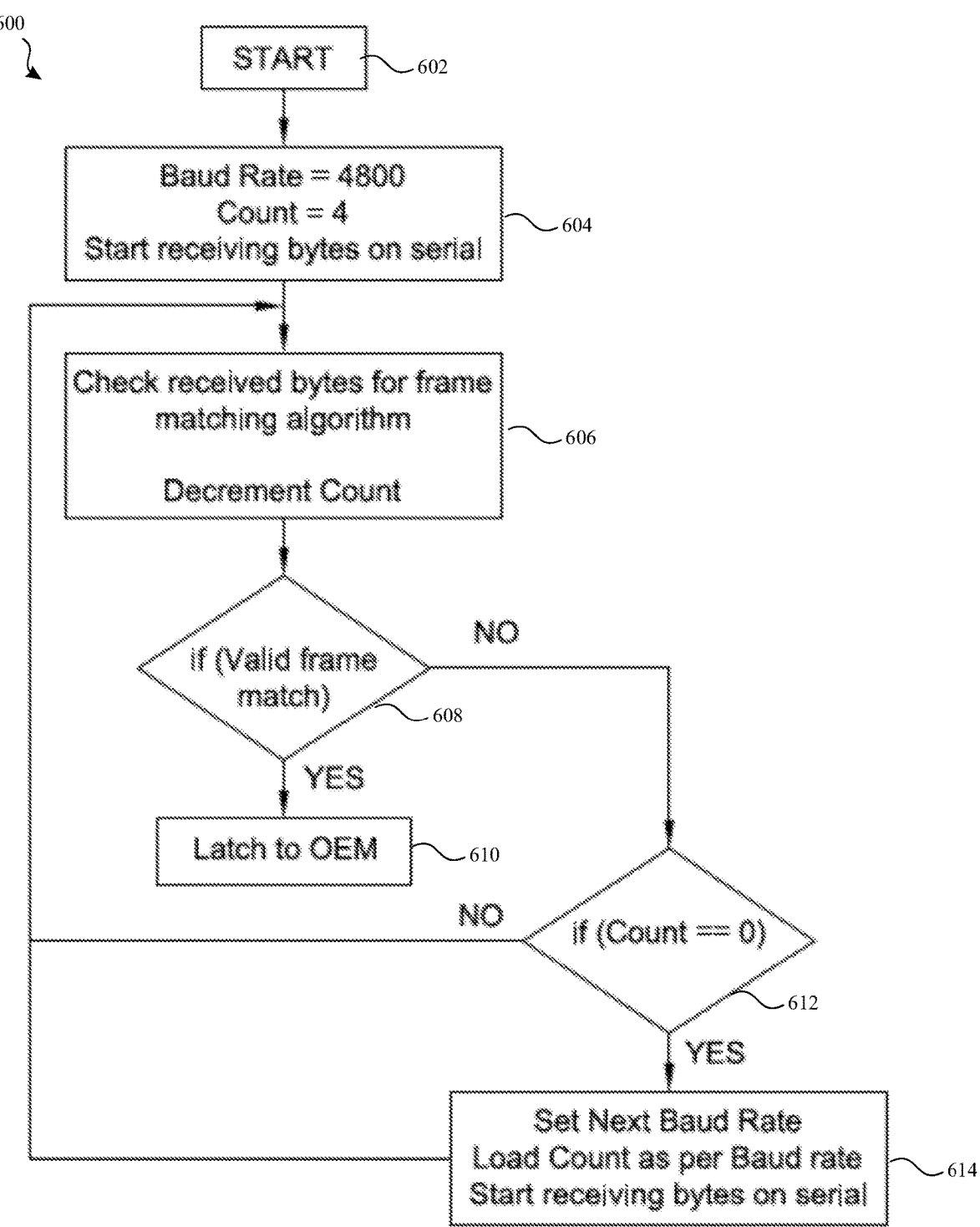
FIG. 6 is a flow diagram for a method of detecting which remote control system is transmitting commands.

FIG. 6 is a flow diagram 600 for an example method of detecting which remote control system 104 is transmitting commands. The method shown in FIG. 6 may be implemented to start 602, for example, in processor 406, i.e., the software application configures processor 406 to recognizing the number of bytes received 604 is different for different data rates, or baud rates. Processor 406 decrements 606 through received bytes to attempt to match frames with one or more frame formats stored in memory, e.g., a look up table. When a match is found, the frame format and data rate lock in 610 occurs. If matching frames cannot be found, then processor 406 varies 614 the data rate if the decrement 606 has reduced a value of count, which may be initialized, for example, as 4, to a value of 0 as shown in the flow diagram 600 as 612; otherwise, the operations shown in the flow diagram 600 as 606 are repeated.

Referring again to FIG. 5, processor 406 is configured by the software application to employ certain aspects of the communication protocol to transmit 510 an appropriate response to the command from remote control system 104. More specifically, processor 406 instructs communications interface 402 to transmit a response over the wired serial channel, e.g., RS485, to remote control system 104.

Processor 406 is further configured, for certain commands, to employ certain aspects of the communication protocol to interpret 512 the command in input-level processing to generate system-level commands for driving the electric motor 106. In certain embodiments, processor 406 generates system-level commands and transmits them to second control board 114 over control bus 113 to drive electric motor 106.

Embodiments of the pump system described herein thus include a control system implemented on a single control board or optionally separated into a first control board (e.g., an "application board") and a second control board (e.g., a "drive board"). In one example embodiment, the first control board is enclosed in a top box, which may be coupled to an exterior portion of the pump system, such as an exterior of a pump motor. The second control board may be contained within a motor housing and communicatively coupled via a wired and/or wireless connection to the first control board. In operation, the control system communicates over a wired with a remote control system, such as an automation system, which a user may interface with to provide input. In one example embodiment, the first control board processes the input to generate one or more system-level commands for controlling operation of the motor, such as "stop," "go," and/or "status" commands. Advantageously, the first control board may be replaced or swapped out of the control system without replacement of the second control board contained within the motor housing.

The systems and methods described herein may be implemented using computer programming or engineering techniques including computer software, firmware, hardware or any combination or subset thereof, wherein the technical effects and specific improvements to the technology and technical field may include one or more of: (a) providing a control system optionally physically separated into a first control board and a second control board; (b) providing the first control board within a top box, which may be coupled to an exterior of the pump system, such as an exterior of a motor of the pump system; (c) providing the second control board within the motor housing for added security and protection of the second control board; (d) facilitating, by the control system, wired serial communication with a remote control system; (e) implementing fundamental portions of communication protocols employed by various distinct remote control systems; (f) determining, based on receipt of a command from a remote control system, which communication protocol to employ in responding to commands and in operating the electric pump motor; and (g) interpretation of the command by the control system, using at least a portion of the determined communication protocol, to one or more system-level control signals for driving or controlling the pump, such as "go," "stop," and/or "status" commands.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is generally not intended to imply certain embodiments require at least one of X, at least one of Y, and at least one of Z to each be present. Additionally, conjunctive language such as the phrase "at least one of X, Y, and Z," unless specifically stated otherwise, should be understood to mean any combination of at least one of X, at least one of Y, and at least one of Z.

Some embodiments involve the use of one or more electronic processing or computing devices. As used herein, the terms "processing unit" and "processor" and related terms, e.g., "processing device," "computing device," and "controller" are not limited to just those integrated circuits referred to in the art as a computer, but refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processing unit, processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for controlling an electric motor, the control system comprising:
   a communications interface configured to be electrically coupled with a remote control system and receive a command therefrom; and
   a processing unit coupled to the communication interface and configured to:
      receive the command from the communications interface;
      based on processing of the command, determine a communication protocol from a plurality of communication protocols to employ; and
      control the communications interface to transmit a response to the command using at least a portion of the communication protocol.

2. The control system of claim 1, wherein to determine the communication protocol from the plurality of communication protocols, the processing unit is further configured to interpret the command based on a plurality of parameters of one or more communication protocols of the plurality of communication protocols.

3. The control system of claim 2, wherein the plurality of parameters of the one or more communication protocols of the plurality of communication protocols comprises a frame format, a frame content, or a baud rate of the command.

4. The control system of claim 1, wherein the command includes a sequence of a plurality of frames, each frame of the plurality of frames includes data corresponding to one or more of: a start byte, a command, a length of a command and command data, a checksum, or an end byte.

5. The control system of claim 1, wherein the processing unit is further configured to generate a system-level command corresponding to the command for operating the electric motor.

6. The control system of claim 5, wherein the generated system-level command for operating the electric motor includes adjusting a motor speed of the electric motor.

7. The control system of claim 5, wherein the generated system-level command for operating the electric motor includes adjusting on and off times of the electric motor.

8. The control system of claim 1, wherein the communications interface is implemented using at least one of: Bluetooth, WiFi, near-field communication (NFC), radio frequency (RF), Internet-of-Things (IOT), or a 5G communication protocol.

9. A method for controlling an electric motor using a control system, the method comprising:
   receiving, at the control system via a communications interface of the electric motor configured to be electrically coupled with a remote control system, a command;
   based on processing of the command, determining a communication protocol from a plurality of communication protocols to employ; and
   controlling the communications interface to transmit, from the control system to the remote control system, a response to the command using at least a portion of the communication protocol.

10. The method of claim 9, wherein the determining the communication protocol from the plurality of communication protocols comprises interpreting the command based on a plurality of parameters of one or more communication protocols of the plurality of communication protocols.

11. The method of claim 10, wherein the plurality of parameters of the one or more communication protocols of the plurality of communication protocols comprises a frame format, a frame content, or a baud rate of the command.

12. The method of claim 9, wherein the command includes a sequence of a plurality of frames, each frame of the plurality of frames includes data corresponding to one or more of: a start byte, a command, a length of a command and command data, a checksum, or an end byte.

13. The method of claim 9, further comprising generating a system-level command corresponding to the command for operating the electric motor.

14. The method of claim 13, wherein the generated system-level command for operating the electric motor includes adjusting a motor speed of the electric motor.

15. The method of claim 14, wherein the generated system-level command for operating the electric motor includes adjusting on and off times of the electric motor.

16. The method of claim 9, wherein the communications interface is implemented using at least one of: Bluetooth, WiFi, near-field communication (NFC), radio frequency (RF), Internet-of-Things (IOT), or a 5G communication protocol.

17. An electric motor, comprising:
   a control system comprising an application board and a drive board; and
   a communications interface configured to be electrically coupled with a remote control system and receive a command therefrom at the application board;
   wherein the application board is configured to:
      process the command to determine a communication protocol from a plurality of communication protocols to employ;

generate and transmit, to the drive board, a system-level command corresponding to the command for operating the electric motor; and control the communications interface to transmit a response to the command using at least a portion of the communication protocol; and wherein the drive board is configured to:

receive, from the application board, the system-level command for operating the electric motor; and based on the system-level command, generate and transmit a control signal to a pump of the electric motor.

18. The electric motor of claim 17, wherein the processing unit is further configured to determine the communication protocol from the plurality of communication protocols by interpreting the command based on a plurality of parameters of one or more communication protocols of the plurality of communication protocols.

19. The electric motor of claim 18, wherein the plurality of parameters of the one or more communication protocols of the plurality of communication protocols comprises a frame format, a frame content, or a baud rate of the command.

20. The electric motor of claim 17, wherein the generated system-level command for operating the electric motor includes adjusting a motor speed of the electric motor or adjusting on and off times of the electric motor.

* * * * *